United States Patent Office 3,155,559
Patented Nov. 3, 1964

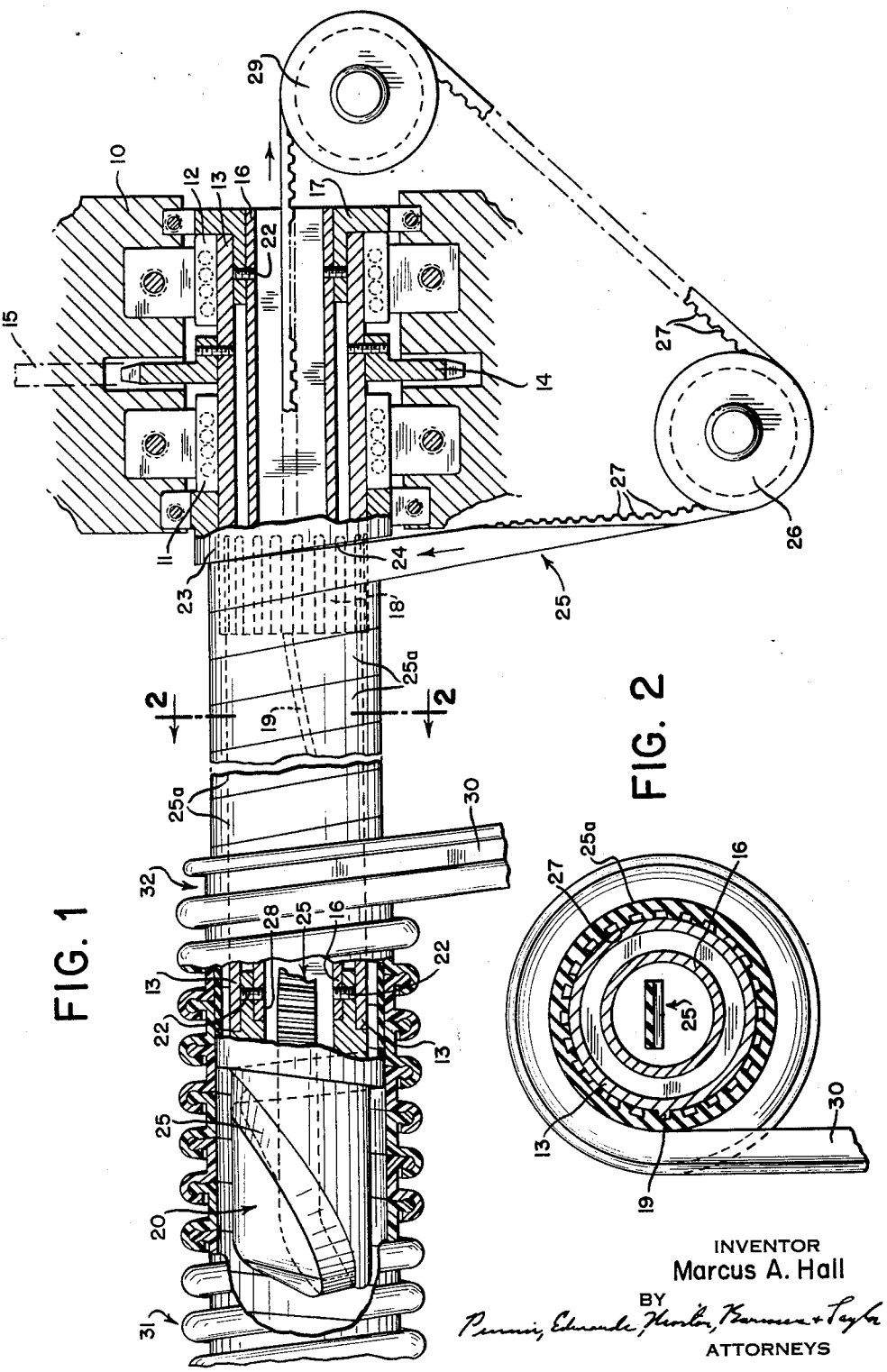

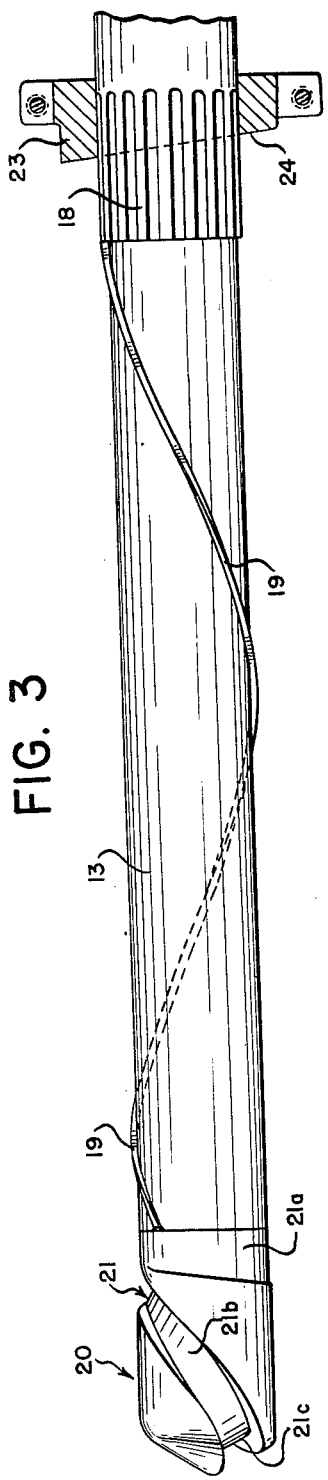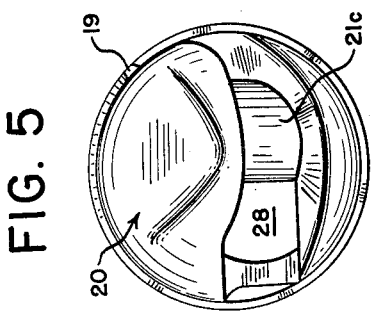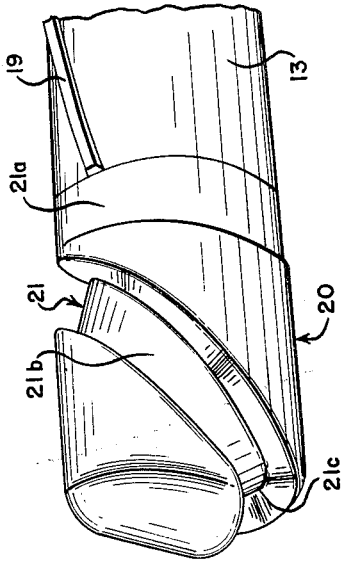

3,155,559
METHOD AND APPARATUS FOR FORMING AND CONTINUOUSLY ADVANCING A HELICALLY WOUND MANDREL SURFACE
Marcus A. Hall, Branford, Conn., assignor to Flexible Tubing Corporation, Guilford, Conn., a corporation of Connecticut
Filed May 17, 1962, Ser. No. 195,517
14 Claims. (Cl. 156—195)

This invention relates to the manufacture of indefinite length articles on a continuously advancing mandrel surface and, more particularly, to an improved method and apparatus based on the use of a novel mandrel surface of definite length which continuously advances and then collapses inwardly and which may be circumferentially complete if desired.

There are many applications for an elongated device having a surface which moves longitudinally as the article itself remains axially stationary and supported only at one end. One major use is as a mandrel in the manufacture of indefinite length articles, especially indefinite length helically fabricated tubing. A continuously advancing mandrel surface may be wrapped helically with strip or other fabricating elements, and upon suitable attachment of the successively applied convolutions there emerges from the end of the mandrel surface a progressively advancing finished tube of indefinite extension. Because of the obvious advantages of such continuous manufacture over the use of ordinary mandrels, several attempts at the design of moving mandrel surfaces have been made, though none with complete success.

Perhaps the most refined of the conventional devices and methods relating to continuously advancing mandrels is one wherein longitudinal segments of a mandrel surface are defined by portions of closed-loop belts which travel along the surface of the mandrel structure and return through its interior. The shortcomings of this design, however, are several. It is difficult to provide the outer run of the belts with an arcuate surface which conforms to the ordinarily desired cylindrical shape of the mandrel, and as a result the helically applied fabricating strips are wrapped about several circumferentially spaced longitudinal flats which may distort the bore of the finished tube. Also, there are defined between the longitudinal belts either gaps or portions of the mandrel surface which are axially immovable. Hence, either the mandrel surface is discontinuous or partly in sliding contact with the tube formed on it, both of which characteristics are a considerable disadvantage. The more longitudinal belts provided, the less extensive are these gaps or sliding surfaces, but as their number increases it becomes a problem to include adequate guide rollers for the belts within the confined mandrel structure. This sometimes necessitates dispensing with the drive means for the several sets of rollers and relegating the belts to a mere idling function in association with entirely separate tube-advancing means. Even when a belt drive can be included, it generally must be an involved epicyclic gear train if rotation is also to be imparted to the mandrel.

All of these disadvantages are overcome as a result of this invention, which provides both a new apparatus and method relating to continuously moving mandrel surfaces. Broadly stated, the new continuous-advance definite-length mandrel used in apparatus for making indefinite length articles comprises a frame and a substantially tubular mandrel core axially rotatable with respect to the frame. At least one belt is provided having a portion wrapped helically about the core with its convolutions defining a mandrel surface. Drive means are included for rotating the core with respect to the frame and drawing additional convolutions of the belt about one end of the core. Feeding means are also included on the frame for urging all of the convolutions toward the opposite end of the core. Associated with the belt convolutions is means for maintaining all of the convolutions in a sliding fit about the core. Belt withdrawal means are provided for collapsing each successive convolution inwardly as it reaches the opposite end of the core and returning the collapsed belt through the inside of the core toward the first-mentioned end thereof.

The new method for making indefinite length articles from at least one fabricating element comprises forming an elongated circumferentially complete mandrel surface. All of the complete mandrel surface is continuously translated in a longitudinal direction, continuously collapsed at that end thereof which is forward in relation to the direction of translation, and continuously replaced at that end thereof which is rearward in relation to the direction of translation. As this is done, the extended fabricated element is continuously applied to the mandrel surface adjacent the rearward end thereof so that it advances continuously from the forward end in the form of the desired indefinite length article.

This invention makes possible possible a mandrel surface which may be precisely cylindrical in shape with no face which may be precisely cylindrical in shape with no flats that might otherwise deform the inside circumference of the finished tube. Moreover, the entire surface of the new mandrel advances forwardly so that there is no sliding whatsoever between the fabricated element or tube formed therefrom and the mandrel surface about which it is applied. No guide rollers need be incorporated within the confined interior of the mandrel structure because the surface-defining convolutions of the belt are urged laterally, rather than run longitudinally, from one end of the mandrel to the other. The drive means effecting this advance of the mandrel surface may simply encircle the mandrel's rearward end and does not have to extend through the interior of the structure. Also, no epicyclic gear trains are required because the belt is not driven by rollers rotated with respect to an otherwise rotating mandrel structure.

A preferred embodiment of the invention is described hereinbelow with reference to the accompanying drawings, wherein FIG. 1 is an elevation partly broken away and in section of the new apparatus;

FIG. 2 is a section taken along the line 2—2 of FIG. 1;

FIG. 3 is an elevation of the mandrel core element with the belt removed;

FIG. 4 is an enlarged perspective of the guide device for controlling the collapse of successive belt convolutions at the forward end of the structure; and FIG. 5 is an end view of the guide device shown in FIG. 4.

The new continuous-advance definite-length mandrel type of tube-making machine includes a stationary frame 10 on which are mounted a pair of aligned bearings 11 and 12. An elongated tubular mandrel core 13 is rotatably supported in these bearings and has a drive pinion 14 affixed about its outer surface between the bearings. The pinion is adapted to be driven by drive means which include a schematically illustrated drive gear 15; an electric motor, not shown, may be the primary power source in this drive means. Located concentrically within the core 13 and extending throughout its length is an inner supporting tube 16 which is affixed at one end to a stationary sleeve 17 secured to the frame 10. Hence, when the pinion 14 is driven the mandrel core 13 rotates axially in the bearings 11 and 12 about the stationary supporting tube 16 and sleeve 17.

The mandrel core 13, which projects from the frame 10 by the above-described supporting structure, is shown in detail in FIG. 3. A plurality of spine-like drive teeth 18 are formed about the core 13 immediately adjacent the frame 10. On the surface of the core is a long helically disposed key 19 extending from one of the teeth 18 to the core's outermost end. The drive teeth 18 may be straight, as shown, or they may be disposed in a helical form conforming to that of the key 19. Adjacent that outermost end is a guide device 20, formed with a curvilinear groove 21 described fully hereinbelow, which is rigidly attached as shown in FIG. 1 by means of screws 22 to the end of the inner supporting tube 16. Consequently, the guide device 20 is stationary with respect to the rotating mandrel core element 13. Adjacent the butt end of the core element 13 where the teeth 18 are formed is an annular feed cam 23 having a planar working surface 24 which encircles the drive teeth and faces the opposite end of the core at an angle with respect to the core axis which is ninety degrees less than the helix angle of the key 19. The feed cam 23, which advantageously may be of filled nylon, is affixed to the frame 10 as shown in FIG. 1 and hence is also stationary with respect to the rotating core.

With reference to FIGS. 1 and 2, the apparatus includes a closed-loop flexible belt 25 which is directed around a pulley 26 to the mandrel core 13 at a slight angle with respect to the mandrel core axis so that it passes in edge engagement with the working surface 24 of the feed cam 23 and is wrapped about the drive teeth 18. The width of the belt is about half the maximum effective length of the teeth 18 exposed to the left of the cam working surface 24 as seen in FIG. 3. A multiplicity of lateral gripping teeth 27 are formed on the underside of the belt 25 and are registerable with the drive teeth 18 and the helical key 19. Thus, the belt 25 is positively gripped by the rotating core 13 at the drive teeth 18 and successive convolutions 25a are wrapped about the core. The cross section of the belt may normally diverge somewhat inwardly so that it assumes a rectangular cross section when bent into the shape of the convolutions 25a.

The angle of the working surface 24 of the feed cam 23 urges each successive convolution 25a forwardly off the teeth 18 in such a manner that they adjoin one another to define a circumferentially complete mandrel surface about the core 13. There is suitable correlation between the width of the belt 25 and the helix of the key 19 so that the convolutions 25a have a helix angle ninety degrees less than the key helix angle. As a result, the key 19 engages adjoining teeth 27 on each of the convolutions 25a of the belt and thus keeps the belt from binding about the core as it slides forwardly. A suitable lubricant, of silicone base for example, may be deposited over the core 13 to reduce friction with the convolutions of the belt.

It is to be understood that the function of the key 19 is to maintain each of the belt convolutions 25a of a diameter, preferably uniform, so that they all slide easily along the surface of the core 13. Thus, the outside diameter of the core 13 is correlated with the number, size and spacing of the teeth 27 on the belt 25 so that the key 19 fits between adjoining pairs of teeth 27 at the ends of each convolution 25a with the belt length between those adjoining pairs of teeth permitting a slight looseness about the outer circumference of the core 13. This being so, it will be evident that the key 19 need not be helically disposed along the length of the core 13 in every form of the new apparatus. It may alternatively extend in a straight line along the surface of the core 13 parallel to the core axis. Also, more than one key may be provided. Indeed, the key 19 may be dispensed with entirely if some other means are provided which engage each of the belt convolutions 25a to maintain all of those convolutions in a sliding fit about the core 13. For example, the belt 25 may be formed with sidewardly extending lateral teeth in a manner such that the lateral teeth on one convolution register with those on the adjoining convolutions. Any such modification of or substitution for the key 19 should fix the diameter of each convolution with respect to that of all the others to insure that the long succession of convolutions does not bind about the core before they reach its outer end.

As each successive convolution reaches the outermost end of the core 13, it leaves the rotating core and key 19 and is directed onto the stationary guide device 20. As shown in FIGS. 4 and 5, the belt proceeds into an initial portion 21a of the groove 21 in the guide device, and then is carried around into a portion 21b of the groove in a helical path of increasing lead and decreasing diameter. This fairs into the outermost portion 21c of the groove which carries the belt around the nose of the guide element 21 and back into an inner bore 28 within the guide element. At that point, the plane of the belt 27 is vertically disposed as it moves rearwardly through the guide device 20 and into the base of the inner tubular support 16. As it proceeds through the tubular support 16 it returns to a horizontal orientation and progresses rearwardly through the open back end of the support 16 to a second pulley 29. The pulley 29 maintains sufficient tension on the belt 27 to insure the controlled collapse of each successive convolution inwardly off the outer end of the core 13. After the belt leaves the pulley 29, it proceeds to the pulley 26 and repeats the cycle.

In the operation of this new tube-making machine, the pinion 14 is rotated by the drive gear 15 so that the entire mandrel core 13 turns about its axis at a constant rate. The drive teeth 18 then wrap successive convolutions 25a of the belt about the core which are displaced laterally in a forward direction by the stationary feed cam 23. These adjoining convolutions of the belt define a circumferentially complete mandrel surface which constantly advances forwardly. At the outer end of the mandrel this surface is collapsed inwardly as the belt is passed around the groove 21 in the guide device 20 and is directed under tension back through the tubular support 16. As this process repeats itself a tube may be formed about the mandrel by continuously applying flexible fabricating elements, as for example an interlocking strip 30 shown in FIG. 1, to the continuously advancing mandrel surface. Each successive convolution of the strip 30 overlaps and interlocks with the next and advances with the translating complete mandrel surface defined by the belt 25 until the mandrel surface is collapsed inwardly at the guide device 20. However, the interlocking convolutions of the strip 30 are then self-supporting and proceed on in an continuous fashion from the outer end of the mandrel to form a completed tube 31.

It will be apparent that certain departures in design may be made in this illustrated form of the apparatus for carrying out the function of the feed cam 23, particularly when a relatively strong tubular structure, such as the abovedescribed tube 31, is fabricated. If desired the feed cam 23 may be replaced by an arcuate cam which partly encircles a first convolution 32 of the strip 30 applied about the mandrel, as indicated in FIG. 1. Such an arcuate cam would be affixed to the frame 10 and would fit into the external groove between the male and female portions of the interlocking strip 30 at the first convolution 32. The arcuate cam would be skewed with respect to the mandrel axis at an angle equal to the desired helix angle of the completed tube 31. With the feed cam 23 replaced by such arcuate cam, the belt convolutions 25a would not be adjoining throughout the length of the mandrel, but would be laid with gaps between them as they are drawn about the drive teeth 18. The arcuate cam would urge the convolutions of the completed tube 31 forwardly toward the end of the mandrel and the friction between the tube 31 and the spaced belt convolutions 25a encircled thereby would pull the belt convolution 25a along with the completed tube 31, much in the manner otherwise effected by the feed cam 23. It may prove desirable to make an arcuate cam of this sort of lubricant-saturated porous metal to minimize wear on the first convolution 32 of the strip 30, since the total advancing force for both the belt convolutions 25a and the completed tube 31 is exerted at that first convolution 32.

There are also many other variations of the foregoing method and apparatus which are fully within the scope of the invention. For example, two or more belts 25 may be wrapped about the mandrel core 13, passed around a multiple grooved guide device 20, and returned around the pulleys. This would provide a greater lead to the continuously-advancing mandrel surface which would permit it to advance further at each revolution of the core 13. The fabricating element, such as the interlocking strip 30, would then be applied at a lesser lead by the use of a spinner applicator rotating at the proper speed. A wide variety of helically fabricated flexible tubes can be made by the apparatus and method of the invention other than the interlocking strip hose shown in FIG. 1. Any number of fabricating elements, such as tape and wire and so on, can be applied around the mandrel surface. When in the following claims it is recited that the core is rotatable "with respect to" the frame, it is contemplated that in addition to being rotated as described previously the core 13 may remain stationary with respect to ground while the frame 10 and everything affixed to it may rotate. This would result in simple translation of the mandrel surface defined by the belt convolutions 25a without rotation of that surface.

I claim:
1. In apparatus for making indefinite length articles, a continuously advancing definite length mandrel device comprising:
 (a) frame,
 (b) a substantially tubular mandrel core axially rotatable with respect to said frame,
 (c) at least one belt having a portion wrapped helically about said core with its convolutions defining a mandrel surface,
 (d) drive means for rotating said core with respect to said frame and drawing additional convolutions of said belt about one end of said core,
 (e) feeding means on said frame for urging all of said convolutions toward the opposite end of said core,
 (f) means associated with said belt convolutions for maintaining all of said convolutions in a sliding fit about said core, and
 (g) belt withdrawal means for collapsing each successive convolution inwardly as it reaches said opposite end of the core and returning the collapsed belt through the inside of said core toward the first-mentioned end thereof.

2. In apparatus for making indefinite length tubing, a continuously advancing definite length mandrel device comprising:
 (a) frame,
 (b) a tubular mandrel core axially rotatable with respect to said frame,
 (c) a flexible closed-loop belt having a portion wrapped helically about said core with its convolutions defining a mandrel surface,
 (d) drive means for rotating said core with respect to said frame and drawing additional convolutions of said belt about one end of said core,
 (e) feeding means on said frame for urging all of said convolutions toward the opposite end of said core,
 (f) means associated with said belt convolutions for maintaining all of said convolutions in a sliding fit about said core, and
 (g) belt withdrawal means for collapsing each successive convolution inwardly as it reaches said opposite end of the core and returning the collapsed belt through the inside of said core toward the first-mentioned end thereof and back to where it is again wrapped onto said core.

3. Apparatus according to claim 2 wherein said drive means includes drive teeth encircling said core, and said belt includes a multiplicity of gripping teeth along its inside surface registerable with said drive teeth, whereby said drive teeth draw said convolutions of said belt about said core when said core is rotated with respect to said frame.

4. Apparatus according to claim 3 wherein said means for maintaining said belt convolutions in a sliding fit about said core comprises a key extending the length of the outer surface of the core from one of said drive teeth, said key being registerable with the gripping teeth on said belt.

5. Apparatus according to claim 4 wherein said key is disposed helically along said core at a helix angle ninety degrees greater than that of said belt convolutions.

6. Apparatus according to claim 2 wherein said feeding means comprises a feed cam affixed to said frame engageable with the successive convolutions of said belt when they are initially drawn about said core for urging all of said convolutions in adjoining relation in sliding translation toward the opposite end of said core.

7. Apparatus according to claim 6 wherein said feed cam includes a planar working surface facing said opposite end of said core at an angle with respect to the core axis equal to the helix angle of the helically applied belt convolutions.

8. Apparatus according to claim 2 wherein said belt withdrawal means includes a curved groove belt guide at said opposite end of said core and affixed to the frame through the inside of the core for controlling the collapse of the successive belt convolutions.

9. Apparatus according to claim 8 wherein said belt withdrawal means further includes pulleys rotatable on said frame for directing said belt through the inside of said core and back to where it is again wrapped onto said core.

10. In apparatus for making helically wrapped tubing, a continuously advancing definite length mandrel device comprising:
 (a) a stationary frame,
 (b) a tubular mandrel core axially rotatable with respect to said frame and including:
  (1) drive teeth encircling one end thereof, and
  (2) a key extending along the outside surface of the core,
 (c) a closed-loop flexible belt having a portion wrapped helically about said core with its convolutions adjoining to define a circumferentially complete mandrel surface, said belt including:
  (1) a multiplicity of gripping teeth along its inside surface registerable with said drive teeth and said key,
 (d) drive means for rotating said core and drawing additional convolutions of said belt onto the first-mentioned end of said core at said drive teeth,
 (e) a feed cam affixed to said frame and having a planar working surface adjacent said drive teeth and facing said opposite end of said core at an angle with respect to the core axis, whereby said working surface engages the successive additional belt convolutions and urges all of said convolutions in sliding translation along said core toward said opposite end thereof, and
 (f) belt return means for collapsing each successive convolution inwardly as it is translated off said opposite end of the core and directing said belt through the inside of said core and back to where it is again wrapped onto said core including:
  (1) a belt guide at said opposite end of core and affixed to the frame through the inside of the core for controlling the collapse of each belt convolution.

11. In apparatus for making helically wrapped tubing, a continuously advancing definite length mandrel device comprising:
 (a) a stationary frame,
 (b) a tubular mandrel core axially rotatable with respect to said frame and including,
  (1) drive teeth encircling one end thereof, and (2) a helically disposed key extending along the outside surface of the core from one of said teeth to the opposite end of said core and having a helix angle in excess of ninety degrees, (c) a closed-loop flexible belt having a portion wrapped helically about said core at a helix angle ninety degrees less than said key helix angle and with its convolutions adjoining to define a circumferentially complete mandrel surface, said belt including:

(1) a multiplicity of gripping teeth along its inside surface registerable with said drive teeth and said key, (2) the outside surface of said belt being smooth whereby said complete mandrel surface is uniformly cylindrical, (d) drive means for rotating said core and drawing additional convolutions of said belt onto the first-mentioned end of said core at said drive teeth, (e) a feed cam affixed to said frame and having a planar working surface adjacent said drive teeth and facing said opposite end of said core at an angle with respect to the core axis equal to said belt helix angle, whereby said working surface engages the successive additional belt convolutions and urges all of said convolutions in sliding translation along said core toward said opposite end thereof, and (f) belt return means for collapsing each successive convolution inwardly as it is translated off said opposite end of the core and directing said belt through the inside of said core back to where it is again wrapped onto said core comprising:

(1) pulleys rotatable on said frame for directing said belt through the inside of said core and back to where it is again wrapped onto said core, and (2) a curved-groove belt guide at said opposite end of the core and affixed to the frame through the inside of the core for controlling the collapse of each belt convolution.

12. A continuous method of making indefinite length articles from at least one extended fabricating element which comprises:

(a) forming an elongated circumferentially complete mandrel surface by arranging a flexible belt helically with its successive convolutions adjoining one another, (b) continuously translating all of said complete mandrel surface in a longitudinal direction, (c) continuously collapsing all of said complete mandrel surface at that end thereof which is forward in relation to said direction of translation, (d) continuously replacing said complete mandrel surface at that end thereof which is rearward in relation to said direction of translation, and (e) continuously applying said extended fabricating element to said mandrel surface adjacent said rearward end so that it advances continuously from said forward end in the form of said article.

13. A continuous method of making indefinite length helically fabricated flexible tubing from at least one extended flexible fabricating element which comprises:

(a) forming an elongated circumferentially complete mandrel surface of uniform circular cross section by arranging a flexible belt helically with its successive convolutions adjoining one another, (b) continuously translating said mandrel surface axially, (c) continuously collapsing all of said complete mandrel surface at that end thereof which is forward in relation to said direction of translation, (d) continuously replacing said complete mandrel surface at that end thereof which is rearward in relation to said direction of translation, and (e) helically wrapping said extended fabricating element about said mandrel surface adjacent said rearward end so that it advances continuously from said forward end in the form of said flexible tubing.

14. A continuous method of making indefinite length helically fabricated flexible tubing from at least one extended flexible fabricating element which comprises:

(a) forming an elongated circumferentially complete mandrel surface of uniform circular cross section by arranging a flexible belt helically with its successive convolutions adjoining one another, (b) continuously translating and rotating said mandrel surface axially, (c) continuously collapsing all of said complete mandrel surface at that end thereof which is forward in relation to said direction of translation, (d) continuously replacing said complete mandrel surface at that end thereof which is rearward in relation to said direction of translation, (e) said collapsing and replacing being at a rate equal to the rate of said translation, and (f) helically wrapping said extended fabricating element about said mandrel surface adjacent said rearward end so that it advances continuously from said forward end in the form of said flexible tubing.

References Cited in the file of this patent

UNITED STATES PATENTS

| | | |
|---|---|---|
| 2,416,416 | Stoltz | Feb. 25, 1947 |
| 2,828,239 | Fischer | Mar. 25, 1958 |

FOREIGN PATENTS

| | | |
|---|---|---|
| 805,620 | Great Britain | Dec. 10, 1958 |